Feb. 19, 1946. T. L. GIBB 2,394,994

FLOAT CONTROL VALVE

Filed July 17, 1944

INVENTOR.
THOMAS L. GIBB
BY
Martin E. Anderson
Attorney

Patented Feb. 19, 1946

2,394,994

UNITED STATES PATENT OFFICE 2,394,994

FLOAT CONTROL VALVE

Thomas L. Gibb, Denver, Colo., assignor of one-half to Gail L. Danby, Denver, Colo.

Application July 17, 1944, Serial No. 545,245

1 Claim. (Cl. 137—104)

This invention relates to improvements in mechanisms for operating float controlled valves of the type employed in connection with flush tanks.

In many different places it is necessary to maintain water in a tank at a predetermined level and the most common example is to be found in connection with the ordinary toilets employing an elevated flush tank.

Flush tanks of the type to which this invention relates are usually each provided with a valve that is controlled in its operation by means of a float connected to an arm pivoted to the supply valve body.

Such valve operating means have the serious objection that they produce a considerable amount of noise, especially during the closing operation, because this is effected gradually whereby the valve opening decreases slowly and makes it necessary for the water to enter through a very restricted opening which results in the objectionable noise.

The objections above pointed out have been recognized by others and patents employing springs and floats for this purpose are in existence.

It is the object of this invention to produce a practically noiseless float valve which does not require springs for effecting the result desired.

Another object of the invention is to produce a valve that will respond to the action of gravity, for the purpose of quickly closing the supply valve.

Another object of the invention is to produce a valve operating mechanism that can be used with most of the standard valve constructions and which can therefore be applied to float valves now in existence without any material change.

Another object of the invention is to produce a simple and substantial operating mechanism for float controlled valves that can be manufactured at a comparatively low cost and which can be installed with a comparatively small amount of labor.

A further object of the invention is to produce a valve operating mechanism of the type identified which can be adjusted so as to obtain the optimum operating conditions.

The above and other objects that may become apparent as this description proceeds are attained by means of a construction and an arrangement of parts that will now be described in detail and for this purpose reference will be had to the accompanying drawing in which the invention has been illustrated in its preferred form, and in which.

Figure 1:
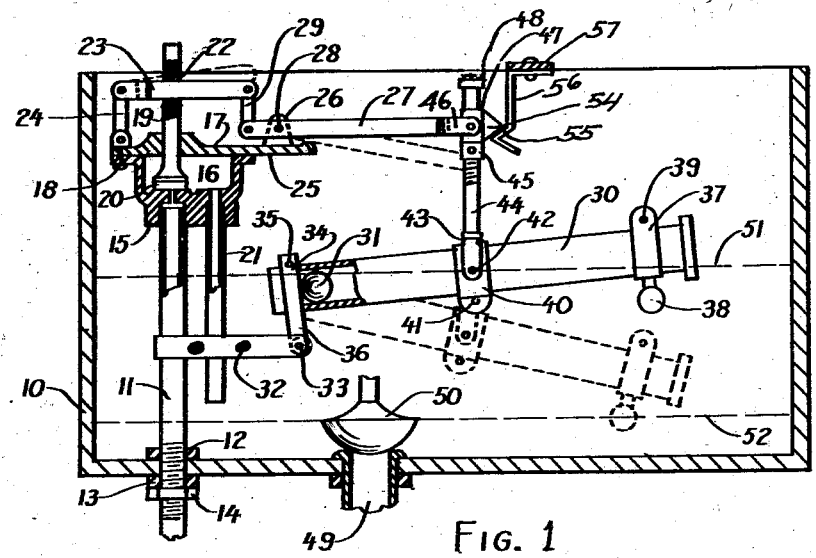
Figure 1 is a vertical section through a flush tank showing the invention positioned therein.

In the drawing numeral 10 represents an ordinary flush tank that is connected with the water supply by means of a pipe 11. This pipe extends through the bottom and is provided with the ordinary watertight seals which have been indicated by the collar 12, the washer 13 and the nut 14. Attached to the upper end of this pipe is the supply control valve which comprises a body 15 having a chamber 16 in its upper end. A cap 17 is secured to the body by screws or bolts 18. A valve stem 19 extends through the cover and is provided with a washer 20 that engages the valve seat to cut off the water supply. A pipe 21 extends downwardly from the chamber 16 and terminates adjacent the bottom of the tank.

The valve stem is provided with an opening 22 through which the lever 23 extends. A link 24 connects the end of lever 23 with the cover 17. The opposite end of the cover is provided with a projection 25 and has two upwardly extending ears 26. A valve control element or lever 27 is positioned between the ears 26 and is connected with them by means of a pivot 28. A short link 29 connects the end of lever 27 with the corresponding end of lever 23. It is now apparent that by tilting the lever 27 about its pivot, the valve stem will be moved upwardly or downwardly so as to open or close the valve. When the valve stem is moved upwardly, water will flow into chamber 16 and thence into the tank through pipe 21. The valve that has just been described is constructed in an old and well known manner and no novelty is claimed therefor.

In the usual construction a hollow spherical ball is connected to the outer end of lever 27 and rests on top of the surface of the water and this serves to open and close the valve in accordance with the water level.

Figure 6:
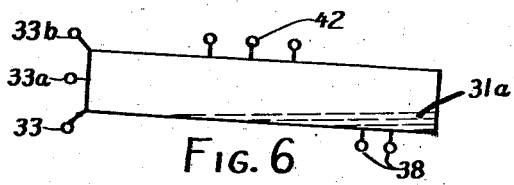
Figure 6 is a diagrammatic view showing how the position of the different forces can be varied so as to obtain any desired adjustment.

Instead of the ordinary float, applicant has provided a valve operating mechanism comprising a tubular float 30 which is closed at both ends and made entirely watertight. Within the float is positioned a movable weight such as a lead ball 31 or a mass of liquid 31a as shown in Figure 6. The ball may be of lead or any other suitable material and the liquid may be mercury or water, or any other suitable liquid, preferably of high specific gravity. Secured to the pipes 11 and 21 is a bracket 32 whose ends are perforated for the reception of a pivot 33. A band 34 encircles the float adjacent one end and is clamped in position by means of a screw 35. This band has a downward projection 36 that is positioned between the ends of the bracket 32. It is now apparent that the float can be moved about the pivot 33. Positioned adjacent the free end of the float is a band 37 that carries a weight 38. This band can be adjusted longitudinally and clamped in adjusted position by means of a screw 39. Attached to the tubular member is another band 40 that is held in adjusted position by means of a screw 41. This band is provided with trunnions 42 to which the ends of the yoke 43 are pivoted. Extending upwardly from the yoke is a rod 44 which is threaded and to which a nut 45 is applied. The end of lever 27 is forked providing two fingers 46 between which is pivotally connected a tubular sleeve 47. A collar 48 is secured to the upper end of the rod 44. It will be observed that there is a lost-motion connection between the sleeve 47 and the rod 44. The extent of this lost-motion connection is determined by the position of the nut 45 and the collar 48.

At the bottom of the box is an outlet opening formed in the upper end of the nipple 49 and this is normally closed by a valve 50.

Let us now assume that the tank contains water whose upper surface level is indicated by reference numeral 51. The tubular float is inclined towards the pivot and the buoyance of this float produces a force acting through the rod 44 which tends to rotate the lever 27 counterclockwise, thereby moving the valve stem 19 downwardly and closing the supply valve.

Let us now suppose that the valve 50 is raised, thereby permitting the water to flow outwardly from the tank. The float will now move in a clockwise direction and when the nut 45 is separated from the sleeve 47, the force of the water will open the supply valve allowing water to enter the tank. A detent may be provided to hold the supply valve in closed position for some time, as will be hereinafter further described.

Figures 2, 3:
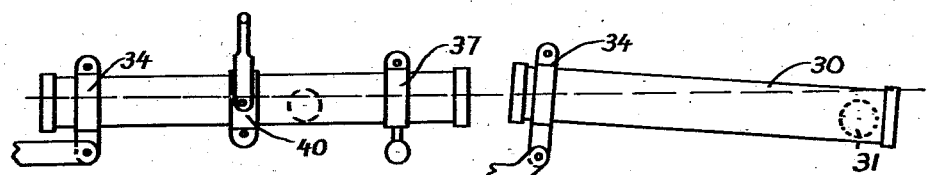
Figure 2 is a side elevation of the tubular float showing it in horizontal position.
Figure 3 is a view similar to that shown in Figure 2 and shows the float valve inclined and the movable weight positioned at the outer end thereof.
Figures 4, 5:
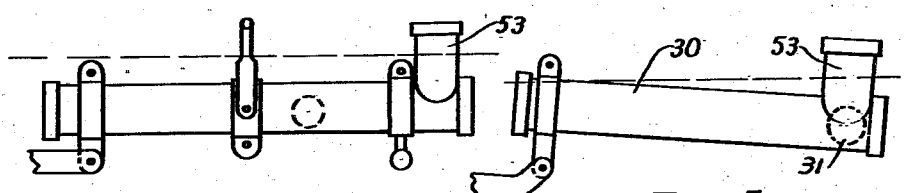
Figure 4 is a view similar to that shown in Figure 2, but shows a slight modification.
Figure 5 is a view similar to that shown in Figure 4 and shows the float outwardly inclined with the weight at its outer end.

When the float reaches a position in which it is slightly downwardly and outwardly inclined, the ball 31 or the liquid 31a, whichever is used, will move, in response to the action of gravity, to the outer end of the tubular float, as shown in Figures 3, 5 and 6. The float will now drop suddenly to a lower level and will remain partly submerged. When the water reaches the level designated by reference numeral 52, valve 50 will close and since the supply valve is open, the water will continue to rise and the tubular float will move counterclockwise about its pivot until it reaches a point in which it is inclined towards the pivoted end, whereupon the weight will move towards the inner end, which results in a sudden upward movement of the float, whereby the nut 45 will be brought into engagement with the sleeve 47 and the parts moved quickly to valve closing position. Since this closing action takes place suddenly, the noise usually produced by the slow closing of the valve will be eliminated.

It will be observed that the bands 34, 37 and 40 can be adjusted along the tubular float and by this means the relationship of the forces can be varied so as to obtain the best results. By moving the band 37, the weight 38 is also moved and by this means an adjustment is effected that has a result comparable to the changing of the weight of movable material within the tubular member. The pivot 33 can also be positioned in other relations to the float, as indicated by 33, 33a and 33b in Figure 6. The pivot 42 can also be shifted and by this means very accurate adjustments can be made.

In Figures 4 and 5 the outer end of the float has been shown as provided with an upwardly extending tubular chamber 53. By thus providing an additional displacement, it is possible to use a heavier weight and to produce greater opening and closing forces than when this chamber is not present.

Figure 7:
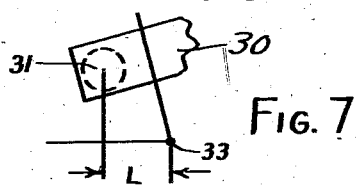
Figure 7 is a diagrammatic view showing the effect of changing the pivot point with respect to the adjacent end of the float.

In Figure 7, the pivot 33 has been shown as displaced towards the outer end of the float which permits the ball or other weight to move to the other side of the pivot thereby producing an additional closing force which is proportional to the product of the weight times the lever arm L. This offers another adjustment that can be taken advantage of where necessary.

It may sometimes be desirable to maintain the supply valve closed until the water level has fallen until the weight has moved to the outer end of the float. In such a case sleeve 38 may be provided with a projection 54 positioned to engage the inclined surface 55 of spring 56 whose upper end is attached to the bar 57 that rests on the upper edge of tank 10. When the ball 31 or weight 31a moves to the outer end of the tubular float, collar 48 on the upper end of rod 44 will engage the upper end of sleeve 47 and release the valve which will then move quickly to open position.

Having described the invention what is claimed as new is:

In a liquid level control mechanism for use in a flush tank having a supply pipe, a valve body having a valve operatively connected with the liquid supply pipe for controlling flow of liquid therethrough, a pivoted control element operatively associated with the valve for opening and closing it, a pivot positioned below the valve control element, in a fixed position relative to the valve, an elongated tubular float element attached to the pivot, adjacent one end, for limited oscillating movement about the pivot, a link pivoted at its lower end to the float element at a point remote from the pivoted end of the float, and extending upwardly therefrom and operatively connected with the valve control element, the link having a lost-motion connection with at least one of the said elements, said lost-motion connection comprising means for adjusting the effective length of the link, and a resilient detent mechanism associated with the valve control element for retaining it in fixed position during the free portions of the movement of the lost-motion connection.

THOMAS L. GIBB.